US011958981B2

(12) United States Patent
Numrich et al.

(10) Patent No.: US 11,958,981 B2
(45) Date of Patent: Apr. 16, 2024

(54) GRANULAR MIXED OXIDE MATERIAL AND THERMAL INSULATING COMPOSITION ON ITS BASIS

(71) Applicant: EVONIK OPERATIONS GMBH, Essen (DE)

(72) Inventors: Uwe Numrich, Gross-Zimmern (DE); Christian Moers, Langen (DE); Bettina Gerharz-Kalte, Hünfelden (DE); Björn Lazar, Hasselroth (DE); Matthias Geisler, Nörten-Hardenberg (DE)

(73) Assignee: Evonik Operations GmbH, Essen (DE)

( * ) Notice: Subject to any disclaimer, the term of this patent is extended or adjusted under 35 U.S.C. 154(b) by 619 days.

(21) Appl. No.: 17/260,345

(22) PCT Filed: Jul. 9, 2019

(86) PCT No.: PCT/EP2019/068361
§ 371 (c)(1),
(2) Date: Jan. 14, 2021

(87) PCT Pub. No.: WO2020/016050
PCT Pub. Date: Jan. 23, 2020

(65) Prior Publication Data
US 2021/0292233 A1  Sep. 23, 2021

(30) Foreign Application Priority Data
Jul. 17, 2018  (EP) .................................... 18183952

(51) Int. Cl.
| | |
|---|---|
| C09C 1/30 | (2006.01) |
| B01J 2/30 | (2006.01) |
| C04B 26/06 | (2006.01) |
| C04B 26/32 | (2006.01) |
| C04B 40/02 | (2006.01) |
| C04B 111/27 | (2006.01) |
| C04B 111/28 | (2006.01) |
| E04B 1/74 | (2006.01) |
| F16L 59/02 | (2006.01) |

(52) U.S. Cl.
CPC ................. *C09C 1/309* (2013.01); *B01J 2/30* (2013.01); *C04B 26/06* (2013.01); *C04B 26/32* (2013.01); *C04B 40/0263* (2013.01); *F16L 59/028* (2013.01); *C01P 2004/50* (2013.01); *C01P 2004/61* (2013.01); *C01P 2004/80* (2013.01); *C01P 2006/11* (2013.01); *C01P 2006/12* (2013.01); *C01P 2006/90* (2013.01); *C04B 2111/27* (2013.01); *C04B 2111/28* (2013.01); *C04B 2201/20* (2013.01); *E04B 2001/742* (2013.01)

(58) Field of Classification Search
CPC ..... C04B 25/06; C04B 25/32; C04B 2111/27; C04B 2111/20; C01P 2006/12; C01P 2006/11; C01P 2006/90; C01P 2004/50; C01P 2004/61; C01P 2004/80; C09C 1/309; B01J 2/30; F16L 59/628

See application file for complete search history.

(56) References Cited

U.S. PATENT DOCUMENTS

| | | | |
|---|---|---|---|
| 2,595,262 A | 5/1952 | Hood | |
| 3,532,473 A | 10/1970 | Biegler et al. | |
| 3,562,177 A | 2/1971 | Teicher et al. | |
| 3,574,027 A | 4/1971 | Bonnet | |
| 4,048,290 A | 9/1977 | Lee | |
| 4,175,159 A | 11/1979 | Raleigh | |
| 4,212,925 A | 7/1980 | Kratel et al. | |
| 4,247,708 A | 1/1981 | Tsutsumi et al. | |
| 4,276,274 A | 6/1981 | Heckel | |
| 4,286,990 A | 9/1981 | Kleinschmidt et al. | |
| 4,297,143 A | 10/1981 | Kleinschmidt et al. | |
| 5,086,031 A | 2/1992 | Deller et al. | |
| 5,183,710 A | 2/1993 | Gerbino | |
| 5,458,916 A | 10/1995 | Kratel et al. | |
| 5,556,689 A * | 9/1996 | Kratel .................. | F16L 59/028 501/39 |
| 5,565,142 A | 10/1996 | Deshpande et al. | |
| 5,685,932 A | 11/1997 | Stohr et al. | |
| 5,776,240 A | 7/1998 | Deller et al. | |

(Continued)

FOREIGN PATENT DOCUMENTS

| | | |
|---|---|---|
| CA | 2 201 186 | 9/1997 |
| CN | 106316439 | 1/2017 |

(Continued)

OTHER PUBLICATIONS

International Search Report for corresponding PCT/EP2019/068361 filed Jul. 9, 2019.
Written Opinion of the International Searching Authority for corresponding PCT/EP2019/068361 filed Jul. 9, 2019.
International Preliminary Report on Patentability for PCT/EP2019/068361 filed Jul. 9, 2019.
English language translation of the International Search Report for PCT/EP2018/075446 filed Sep. 20, 2018; corresponding to copending application U.S. Appl. No. 16/978,164.
English language translation of the Written Opinion of the International Searching Authority for PCT/EP2018/075446 filed Sep. 20, 2018; corresponding to copending application U.S. Appl. No. 16/978,164.
English language translation of the International Preliminary Report on Patentability for PCT/EP2018/075446 filed Sep. 20, 2018; corresponding to copending application U.S. Appl. No. 16/978,164.

(Continued)

*Primary Examiner* — C Melissa Koslow

(74) *Attorney, Agent, or Firm* — Law Office of: Michael A. Sanzo, LLC

(57) ABSTRACT

Hydrophobized granular material comprising from 30 to 95% by weight of a pyrogenic mixed oxide based on silica and at least one oxide of metal M selected from of Al, Ti and Fe with the content of metal M oxide in the mixed oxide being from 01 to 10% by weight, and from 5 to 70% by weight of at least one IR-opacifier selected from the group consisting of silicon carbide, zirconium dioxide, ilmenites, iron titanates, zirconium silicates, manganese oxides, graphites, carbon blacks and mixtures thereof.

20 Claims, No Drawings

(56) References Cited

U.S. PATENT DOCUMENTS

| | | |
|---|---|---|
| 5,851,715 A | 12/1998 | Barthel et al. |
| 6,099,749 A | 8/2000 | Boes et al. |
| 6,268,423 B1 | 7/2001 | Mayer et al. |
| 6,303,256 B1 | 10/2001 | Kerner et al. |
| 6,472,067 B1 | 10/2002 | Hsu et al. |
| 6,479,156 B1 | 11/2002 | Schmidt et al. |
| 7,241,336 B2 | 7/2007 | Scharfe et al. |
| 7,562,534 B2 | 7/2009 | Jibb et al. |
| 7,674,476 B1 | 3/2010 | Schwertfeger et al. |
| 7,855,248 B2 | 12/2010 | Stenzel et al. |
| 8,333,946 B2 | 12/2012 | Gottschalk et al. |
| 8,389,617 B2 | 3/2013 | Meyer et al. |
| 8,603,353 B2 | 12/2013 | Menzel et al. |
| 8,962,519 B2 | 2/2015 | Heindl et al. |
| 9,233,986 B2 | 1/2016 | Kratel et al. |
| 9,540,247 B2 | 1/2017 | Stenzel et al. |
| 9,593,797 B2 | 3/2017 | Kulprathipanja et al. |
| 9,784,402 B2 | 10/2017 | Menzel |
| 9,878,911 B2 | 1/2018 | Maisels et al. |
| 10,005,942 B2 | 6/2018 | Kim et al. |
| 10,125,234 B2 | 11/2018 | Hoffman et al. |
| 10,179,751 B2 | 1/2019 | Geisler et al. |
| 10,618,815 B2 | 4/2020 | Hindelang et al. |
| 10,618,849 B2 | 4/2020 | Albinus et al. |
| 10,843,965 B2 | 11/2020 | Jantke et al. |
| 11,046,850 B2 | 6/2021 | Bender et al. |
| 11,565,974 B2 * | 1/2023 | Geisler .............. C04B 41/4933 |
| 2003/0095905 A1 | 5/2003 | Scharfe et al. |
| 2006/0027227 A1 | 2/2006 | Everett et al. |
| 2007/0220904 A1 | 9/2007 | Jibb et al. |
| 2009/0311159 A1 | 12/2009 | Gray |
| 2010/0146992 A1 | 6/2010 | Miller |
| 2010/0300132 A1 | 12/2010 | Schultz |
| 2012/0064345 A1 | 3/2012 | Gini |
| 2012/0286189 A1 | 11/2012 | Barthel et al. |
| 2013/0071640 A1 | 3/2013 | Szillat |
| 2014/0150242 A1 | 6/2014 | Kratel et al. |
| 2014/0323589 A1 | 10/2014 | Lázár et al. |
| 2015/0000259 A1 | 1/2015 | Dietz |
| 2016/0082415 A1 | 3/2016 | Drexel et al. |
| 2016/0084140 A1 | 3/2016 | Dietz |
| 2016/0223124 A1 | 8/2016 | Kulprathipanja et al. |
| 2016/0258153 A1 | 9/2016 | Koebel et al. |
| 2017/0014792 A1 | 1/2017 | Bonnardel et al. |
| 2017/0029681 A1 | 2/2017 | Kim et al. |
| 2017/0233297 A1 | 8/2017 | Albinus et al. |
| 2017/0268221 A1 | 9/2017 | Geisler et al. |
| 2018/0001576 A1 | 1/2018 | Koebel et al. |
| 2018/0065892 A1 | 3/2018 | Geisler et al. |
| 2019/0276358 A1 | 9/2019 | Schultz et al. |
| 2019/0382952 A1 | 12/2019 | Geisler et al. |
| 2020/0031720 A1 | 1/2020 | Geisler et al. |
| 2020/0062661 A1 | 2/2020 | Geisler et al. |
| 2020/0124231 A1 | 4/2020 | Geisler et al. |
| 2021/0039954 A1 | 2/2021 | Numrich et al. |
| 2021/0269359 A1 | 9/2021 | Geisler et al. |
| 2021/0292238 A1 | 9/2021 | Albinus et al. |
| 2023/0002627 A1 | 1/2023 | Lazar et al. |
| 2023/0062574 A1 | 3/2023 | Menzel et al. |
| 2023/0110025 A1 | 4/2023 | Gärtner et al. |

FOREIGN PATENT DOCUMENTS

| | | |
|---|---|---|
| CN | 106830878 | 6/2017 |
| DE | 952891 | 11/1956 |
| DE | 2533925 | 2/1977 |
| DE | 30 37 409 | 5/1982 |
| DE | 199 48 394 | 2/2001 |
| DE | 20 2007 013 074 | 3/2008 |
| DE | 10 2007 020 716 | 11/2008 |
| DE | 10 2007 031 635 | 1/2009 |
| DE | 10 2007 042 000 | 3/2009 |
| DE | 10 2007 051 830 | 5/2009 |
| DE | 10 2008 005 548 | 7/2009 |
| DE | 10 2008 036 430 | 2/2010 |
| DE | 10 2010 040 346 | 3/2012 |
| DE | 10 2013 016 705 | 4/2015 |
| DE | 10 2014 203 091 | 8/2015 |
| EP | 0 032 176 | 7/1981 |
| EP | 0 340 707 | 11/1989 |
| EP | 0 645 576 | 3/1995 |
| EP | 0 647 591 | 4/1995 |
| EP | 0 937 755 | 8/1999 |
| EP | 2 028 329 | 2/2009 |
| EP | 2 204 513 | 7/2010 |
| EP | 2 910 724 | 8/2015 |
| EP | 3 447 038 | 8/2017 |
| EP | 3 403 818 | 11/2018 |
| EP | 3 498 672 | 6/2019 |
| FR | 2873677 | 2/2006 |
| JP | H 10-152360 | 6/1998 |
| KR | 10-2012-0070948 | 7/2021 |
| NO | /EP 2621873 | 4/2018 |
| WO | WO 99/05447 | 2/1999 |
| WO | WO 03/064025 | 8/2003 |
| WO | WO 2005/028195 | 3/2005 |
| WO | WO 2006/097668 * | 9/2006 |
| WO | WO 2010/126792 | 11/2010 |
| WO | WO 2011/020671 | 2/2011 |
| WO | WO 2011/066209 | 6/2011 |
| WO | WO 2011/076518 | 6/2011 |
| WO | WO 2011/083174 | 7/2011 |
| WO | WO 2012/041823 | 4/2012 |
| WO | WO 2012/044052 | 4/2012 |
| WO | WO 2013/053951 | 4/2013 |
| WO | WO 2014/090790 | 6/2014 |
| WO | WO 2014/095277 | 6/2014 |
| WO | WO 2015/007450 | 1/2015 |
| WO | WO 2016/045777 | 3/2016 |
| WO | WO 2016/171558 | 10/2016 |
| WO | WO 2017/097768 | 6/2017 |
| WO | WO 2017/102819 | 6/2017 |
| WO | WO 2021/069351 | 4/2021 |
| WO | WO 2021/239475 | 12/2021 |

OTHER PUBLICATIONS

Mathias, et al., "Basic characteristics and applications of aerosil: 30. The chemistry and physics of the aerosil surface," Journal of Colloid and Interface Science 125:61-68 (1988).

Pajonk, et al., "Physical properties of silica gels and aerogels prepared with new polymeric precursors," J. Non-Cryst. Solids 186(2): 1-8 (Jun. 1995).

Somana, Chotangada Gautham, "Evaluation of Aerogel Composite Insulations by Characterization and Experimental Methods," Thesis; B.Eng., R.V. College of Engineering, Banglore, India, (2012).

U.S. Appl. No. 16/978,164, filed Sep. 3, 2020.

U.S. Appl. No. 16/339,081, filed Apr. 3, 2019, US-2019/0276358 A1, Sep. 12, 2019, Schultz.

U.S. Appl. No. 16/478,169, filed Jul. 16, 2019, US-2020/0031720 A1, Jan. 30, 2020, Geisler.

U.S. Appl. No. 16/484,368, filed Aug. 7, 2019, US-2019/0382952 A1, Dec. 9, 2019, Geisler.

U.S. Appl. No. 16/605,342, filed Oct. 15, 2019, US-2020/0062661 A1, Feb. 27, 2020, Geisler.

U.S. Appl. No. 16/620,481, filed Dec. 6, 2019, US-2020/0124231 A1, Apr. 23, 2020, Geisler.

U.S. Appl. No. 17/260,227, filed Jan. 14, 2021, Geisler.

U.S. Appl. No. 17/260,371, filed Jan. 14, 2021, Albinus.

U.S. Appl. No. 17/927,040, filed Nov. 22, 2022, Giesseler.

International Search Report for PCT/EP2021/050105 filed Jan. 6, 2021; corresponding to copending application U.S. Appl. No. 17/792,400.

Written Opinion of the International Searching Authority for PCT/EP2021/050105 filed Jan. 6, 2021; corresponding to copending application U.S. Appl. No. 17/792,400.

International Preliminary Report on Patentability for PCT/EP2021/050105 filed Jan. 6, 2021; corresponding to copending application U.S. Appl. No. 17/792,400.

(56) References Cited

OTHER PUBLICATIONS

Partial European Search Report and Search Opinion for U.S. Appl. No. 17/792,400; corresponding to copending application U.S. Appl. No. 17/792,400.
International Search Report for PCT/EP2021/060255 filed Apr. 20, 2020; corresponding to copending application U.S. Appl. No. 17/922,203.
Written Opinion of the International Searching Authority for PCT/EP2021/060255 filed Apr. 20, 2020; corresponding to copending application U.S. Appl. No. 17/922,203.
International Preliminary Report on Patentability for PCT/EP2021/060255 filed Apr. 20, 2020; corresponding to copending application U.S. Appl. No. 17/922,203.
European Search Report and Search Opinion for U.S. Appl. No. 17/922,203; corresponding to copending application U.S. Appl. No. 17/922,203.
Malfait, Wim J., et al., Surface Chemistry of Hydrophobic Silica Aerogels, *Chemistry of Materials* 27(19):6737-6745 (Oct. 2015).
U.S. Appl. No. 17/802,656, filed Aug. 26, 2022, Gärtner.
U.S. Appl. No. 17/922,203, filed Oct. 28, 2022, Numrich.
U.S. Appl. No. 17/792,400, filed Jul. 31, 2022, Lazar.
U.S. Appl. No. 17/792,471, filed Jul. 13, 2022, Menzel.
Non Final Office Action mailed May 11, 2023 for copending U.S. Appl. No. 16/978,164, filed Sep. 3, 2020.
Response to Non Final Office Action filed Jul. 28, 2023 for for copending U.S. Appl. No. 16/978,164, filed Sep. 3, 2020.
Non Final Office Action dated May 11, 2023 for copending U.S. Appl. No. 16/978,164, mailed Oct. 11, 2023.

\* cited by examiner

GRANULAR MIXED OXIDE MATERIAL AND THERMAL INSULATING COMPOSITION ON ITS BASIS

CROSS REFERENCE TO RELATED APPLICATIONS

The present application is US national stage of international application PCT/EP2019/068361, which had an international filing date of Jul. 9, 2019 and which was published on Jan. 23, 2020. The application claims priority to EP 18183952.3, filed in on Jul. 17, 2018. The contents of the priority application is hereby incorporated by reference in its entirety.

The present invention relates to hydrophobized granular materials based on silica based mixed oxide, to processes for production thereof and thermal insulating compositions comprising such materials.

Effective thermal insulation of houses, industrial plants, pipelines and suchlike is an important economic problem. The majority of insulation materials based on organic substances, such as polyurethane foams, are combustible and only usable at restricted temperatures. These disadvantages are not exhibited by the hitherto less widespread thermal insulation materials based on inorganic oxides, for example highly porous silicon dioxide. In the case of use of such materials for thermal insulation, by contrast, the optimization of the mechanical properties, for example particle size and mechanical stability, plays a major role.

Such silica-based thermal insulation materials are typically based on what are called the aerogels, and also precipitated or fumed silicas. More detailed information relating to these silica types can be found in Ullmann's Encyclopedia of Industrial Chemistry, "Silica" chapter, published online on 15 May 2008, DOI: 10.1002/14356007.a23_583.pub3.

WO 2011/083174 A1 discloses a plaster that can be applied to the surface of a building to produce a thermally insulating coating, comprising water, a mineral and/or organic hydraulic binder and 0.5-65 wt. % of a powder or a granular material of at least one hydrophobic silica xerogel or aerogel.

WO 2014/090790 A1 discloses a dry blend for producing a thermally insulating rendering, comprising 60-90 vol. % of a hydrophobized granular silica aerogel, 0.5-30 vol. % of a purely mineral binder, 0.2-20 vol. % of an open-porous water-insoluble additive, 0-5 vol. % reinforcing fibers and 0-5 vol. % processing additives. The thermally insulating rendering can be produced by mixing of such dry blend with water and subsequent hardening.

Silica aerogels, which due to their specific synthesis have pore structures well suitable for their application in thermal insulation, are well-established components of existing thermal insulating compositions. Unfortunately, aerogels are quite expensive, when compared with the other silica types, such as fumed silica and possess inferior thermal insulation properties at elevated temperatures. Therefore, it would be desirable to develop alternative thermal insulating compositions based on other silica types.

A simple substitution of an aerogel material in the thermal insulation composition by a corresponding fumed silica material, e.g. by the one disclosed in WO 2006/097668 A1, would result in a higher thermal conductivity of the resulting composition. Although thermal insulation properties of such compositions can be improved to some extent by increasing the fumed silica loading, starting from a certain level, no more silica can be introduced, because of too high viscosity of the final composition.

WO 2006/097668 A1 discloses a granular thermal insulation material comprising 30-95 wt. % of a microporous insulating material, e.g. hydrophobic fumed silicon dioxide, 5-70 wt. % of an infrared opacifier material, 0-50 wt. % of a particulate insulating filler material and 0-5 wt. % of binder material, e.g. polyvinylalcohol, which is produced by mixing the components and subsequent densification to give granular material having a size of 0.25 to 2.5 mm. The free-flowing materials disclosed in WO 2006/097668 A1 are designed for usage in loose fillings for high temperature insulation applications.

PCT/EP2018/051142 discloses a granular material comprising hydrophobized silicon dioxide and an IR-opacifier with improved mechanical strength. Such materials show less mechanical attrition and are suitable for use in thermal insulating formulations. Method for preparation of such granular materials comprises the following steps: a) mixing a hydrophilic silicon dioxide with at least one IR-opacifier; b) densifying the mixture obtained in step a) to give a granular material; c) subjecting the granular material produced in step b) to thermal treatment at a temperature of 200 to 1200° C.; d) hydrophobizing the granular material subjected to thermal treatment in step c) with a hydrophobizing agent. In an alternative method of preparation of such materials, in step c) treating of the granular material produced in step b) with ammonia is accomplished instead of thermal treatment.

Though silica based granular materials disclosed in PCT/EP2018/051142 are applicable for use in thermal insulation formulations, there is still a need for improvement of viscosity of thermal insulating compositions containing high loadings of such materials.

The problem addressed by the present invention is that of providing a thermal insulating material better applicable for use in thermal compositions. More specifically, the technical problem to be solved by the present invention is providing a silica based thermal insulating material suitable for preparing thermal insulating compositions with a relatively high loading of this silica-based material and a relatively low viscosity and low viscosity increase upon storage of such compositions. Such thermal insulating compositions should on the one side provide a low thermal conductivity and, on the other hand, be well mixable and well applicable on the surface to be insulated.

This object was achieved by provision of a hydrophobized granular material comprising from 30 to 95% by weight of a mixed oxide based on silica and at least one oxide of metal M selected from of Al, Ti and Fe with the content of metal M oxide in the mixed oxide being from 0.1 to 10% by weight, and from 5 to 70% by weight of at least one IR-opacifier selected from the group consisting of silicon carbide, zirconium dioxide, ilmenites, iron titanates, zirconium silicates, manganese oxides, graphites, carbon blacks and mixtures thereof.

Unexpectedly and unforeseeable, taking in consideration the prior art, it was now found that such hydrophobized granular materials provide significant improvement of viscosity of fresh prepared thermal insulating compositions and of those upon storage, when compared to the materials based on pure silica, such as described in PCT/EP2018/051142.

Mixed oxide of the present invention is preferably pyrogenic, that is prepared by a pyrogenic method and therefore comprises pyrogenically prepared (fumed) metal oxides. Pyrogenic (fumed) metal oxides are prepared by means of flame hydrolysis or flame oxidation. This involves oxidizing or hydrolysing hydrolysable or oxidizable starting materials, generally in a hydrogen/oxygen flame. Starting materials used for pyrogenic methods include organic and inorganic substances. Metal halides like silicon tetrachloride are particularly suitable. The hydrophilic metal oxides thus obtained are amorphous. Fumed metal oxides are generally in aggregated form. "Aggregated" is understood to mean that what are called primary particles, which are formed at first in the genesis, become firmly bonded to one another later in the reaction to form a three-dimensional network. The primary particles are substantially free of pores and have free hydroxyl groups on their surface.

Pyrogenic mixed oxides such as pyrogenic silica-alumina mixed oxide are known to be used in various formulations. Thus, in US2003/0095905A1 is disclosed a hydrophilic pyrogenically produced aluminium-silicon mixed oxide powder with a BET surface area of more than 300 m$^2$/g and a content of $Al_2O_3$ of from 0.01 to 99.99 wt. %. This material was found to be well dispersible in aqueous compositions and was suggested for use as a filler in coatings, particularly in inkjet materials.

U.S. Pat. No. 4,286,990 discloses hydrophilic pyrogenically produced silica-aluminium mixed oxide with a BET surface area of 50 to 200 m$^2$/g, containing 0.5 to 20 wt. % of silica, the rest being aluminium oxide. This mixed oxide is found to be thermostable up to 1325° C. and was proposed to be used in thermal insulation compositions. A specific embodiment (example 2) shows preparation of the fine hydrophilic powder with an average particle diameter of 7 nm and alumina content of 97.5 wt. %.

EP 1016932 A1 discloses toner mixtures comprising pyrogenically produced aluminium-silicium mixed oxide with a content of aluminium oxide of 60-70 wt. %, which has been surface treated with hexamethyldisilazane (HMDS).

It is known to produce pyrogenic mixed oxides by simultaneously reacting at least two different metal sources in the form of volatile metal compounds, for example chlorides, in a $H_2/O_2$ flame. One example of such an oxide is the $SiO_2/Al_2O_3$ mixed oxide, which is produced by Evonik under the name Aerosil® MOX 170. When producing Aerosil® MOX 170, a mixture of $SiCl_4$ and $AlCl_3$ is directly hydrolyzed in a flame. Corresponding silanes, such as, for example, methyltrichlorosilane, trichlorosilanes, etc., may also be used as a raw material instead of or in addition to the chlorides. (DE-A 952 891; DE-A 25 33 925; DE-A 27 02 896. These documents each are entirely incorporated herein by reference.)

All components of thus prepared mixed oxides, for example silica and alumina in the afore mentioned case, are generally distributed homogeneously in the whole mixed oxide material as opposed to the other kinds of materials like mechanical mixtures of several metal oxides, doped metal oxides and suchlike. In the latter case, e.g. for the mixture of several metal oxides, separated domains of the corresponding pure oxides may be present, which determine the local properties of such mixtures.

In a particularly preferred embodiment of the invention, the hydrophobized granular material is a pyrogenic silica-alumina mixed oxide (M=Al).

In the present invention, the terms "granular material", "granulate" and "granules" are used as alternatives and are understood to mean a grainy, readily pourable, free-flowing solid material.

A numerical median particle size of the granular material can be determined according to ISO 13320:2009 by laser diffraction particle size analysis. The resulting measured particle size distribution is used to define the median $d_{50}$, which reflects the particle size not exceeded by 50% of all particles, as the numerical median particle size. The hydrophobized granular material of the invention may have a $d_{50}$ of greater than 10 µm, is preferably from 20 to 4000 µm, more preferably from 50 to 3500 µm.

The hydrophobized granular material of the invention preferably comprises only the particles with a size of not more than 6000 µm, preferably 50 to 5000 µm, more preferably of 200 to 4000 µm, determined by dynamic image analysis according to ISO 13322-2:2006. For some applications, it can be preferable, if the hydrophobized granular material of the invention is free, or essentially free, of particles smaller than 200 µm.

The hydrophobized granular material according to the present invention may have a BET surface area of greater than 20 m$^2$/g, preferably of 30 to 500 m$^2$/g, more preferably of 50 to 400 m$^2$/g. The specific surface area, also referred to simply as BET surface area, is determined according to DIN 9277:2014 by nitrogen adsorption in accordance with the Brunauer-Emmett-Teller method.

The terms "hydrophobic" or "hydrophobized" in the context of the present invention are analogous and relate to the particles having a low affinity for polar media such as water. The hydrophilic particles, by contrast, have a high affinity for polar media such as water. The hydrophobicity of the hydrophobic materials can typically be achieved by the application of appropriate nonpolar groups to the silica surface. The extent of the hydrophobicity of a hydrophobized material can be determined via parameters including its methanol wettability, as described in detail, for example, in WO2011/076518 A1, pages 5-6. In pure water, a hydrophobic silica-based material separates completely from the water and floats on the surface thereof without being wetted with the solvent. In pure methanol, by contrast, a hydrophobic silica is distributed throughout the solvent volume; complete wetting takes place. In the measurement of methanol wettability, a maximum methanol content at which there is still no wetting of the silica is determined in a methanol/water test mixture, meaning that 100% of the tested material remains separate from the test mixture after contact with the test mixture, in unwetted form. This methanol content in the methanol/water mixture in % by volume is called methanol wettability. The higher the level of such methanol wettability, the more hydrophobic the tested material. The lower the methanol wettability, the lower the hydrophobicity and the higher the hydrophilicity of the material.

The hydrophobized granular material of the invention may has a methanol wettability of methanol content greater than 5%, preferably of 10% to 80%, more preferably of 15% to 70%, especially preferably of 20% to 65%, most preferably of 25% to 60%, by volume in a methanol/water mixture.

The hydrophobized granular material of the present invention comprises at least one IR opacifier. Such an IR opacifier reduces the infrared transmittance of a heat-insulating material and thus minimizes the heat transfer due to radiation.

The IR opacifier can be selected from the group consisting of silicon carbide, zirconium dioxide, ilmenites, iron titanates, zirconium silicates, manganese oxides, graphites, carbon blacks and mixtures thereof. The particle size of the opacifiers is generally between 0.1 and 25 µm.

The granular material contains from 30% to 95%, preferably from 40% to 90%, more preferably from 50% to 85%, by weight of the mixed oxide based on silica, and from 5% to 50%, preferably from 10% to 40%, more preferably from 15% to 30%, by weight of the opacifier.

The thermal conductivity of the hydrophobized granular material of the invention can be measured according to EN 12667:2001 by the method with the guarded hot plate (GHP) and the heat flow meter instrument. The mean measurement temperature here is 10° C. and the contact pressure 250 Pa; the measurement is conducted under air atmosphere at standard pressure.

The thermal conductivity of the hydrophobized granular material of the invention in the form of a bed, measured according to EN 12667:2001, at a mean measurement temperature of 10° C., a contact pressure of 250 Pa under an air atmosphere and at standard pressure, is preferably less than 50 mW/(m*K), more preferably from 10 to 45, especially preferably from 12 to 40 and most preferably from 15 to 35 mW/(m*K).

The hydrophobized granular material of the present invention has preferably a relatively low content of free hydroxyl groups, such as silanol hydroxyl groups Si—OH on the surface. The hydrophobized granular material has preferably a hydroxyl group density of no greater than 0.3 mmol OH/g, more preferably less than 0.2 mmol OH/g, most preferably less than 0.1 mmol OH/g. The hydroxyl group density of silica or a material comprising silica can be determined by the method published by J. Mathias and G. Wannemacher in Journal of Colloid and Interface Science vol. 125, pages 61-68 (1988) by reaction with lithium aluminium hydride. Using the corresponding BET surface area of the used material, the hydroxyl group density in mmol OH/g can be converted in $OH/nm^2$. The granular material used in the composition of the invention has preferably a hydroxyl group density of no greater than 1 $OH/nm^2$, more preferably less than 0.5 $OH/nm^2$, more preferably less than 0.3 $OH/nm^2$, most preferably less than 0.1 $OH/nm^2$.

Tamped densities of various pulverulent or coarse-grain granular materials can be determined according to DIN ISO 787-11:1995 "General methods of test for pigments and extenders—Part 11: Determination of tamped volume and apparent density after tamping". This involves measuring the apparent density of a bed after agitation and tamping. The granular material of the invention has a tamped density of up to 450 g/l, preferably of 50 to 300 g/l, preferably of 100 to 280 g/l, more preferably of 120 to 250 g/l.

The hydrophobized granular material of the invention is notable for particularly high stability combined with low tamped density. Therefore, with this hydrophobized granular material, it is often the case that undesired material abrasion and fracture during the preparation of a composition comprising such granulates, such as the thermal insulation composition of the present invention, is eliminated or reduced.

The present invention further provides a process (A) for producing a hydrophobized granular material according to the present invention, comprising the following steps:
a) mixing a hydrophilic silica based mixed oxide with at least one IR opacifier;
b) densifying the mixture obtained in step a) to give a hydrophilic granular material;
c) subjecting the hydrophilic granular material produced in step b) to thermal treatment at a temperature of 200 to 1200° C.;
d) hydrophobizing the hydrophilic granular material subjected to thermal treatment in step c) with a hydrophobizing agent.

The invention also provides a further process (B) for producing a hydrophobized granular material according to the present invention, comprising the following steps:
a) mixing a hydrophilic silica based mixed oxide with at least one IR opacifier;
b) densifying the mixture obtained in step a) to give a hydrophilic granular material;
c) treating the hydrophilic granular material produced in step b) with ammonia;
d) hydrophobizing the hydrophilic granular material treated with ammonia in step c) with a hydrophobizing agent.

Steps a) and b) of the processes (A) and (B) according to the invention can be conducted as individual, separate stages, or alternatively in combination in one process step.

Mixing of the hydrophilic silica based mixed oxide with at least one IR-opacifier as per step a) of process (A) or process (B) can be conducted with all suitable mixing apparatus known to those skilled in the art. Any mixers or mills that permit good homogenization, such as, for example, blade mixers, fluidized bed mixers, centrifugal mixers or air-swept mixers, are suitable for performing step a) of the process according to the invention. Particularly suitable mixers are those with which the material being mixed may additionally be compacted, such as, for example plough bar mixers, pan mills or ball mills.

Densification of the mixture obtained in step a) to give a granular material as per step b) of process (A) or process (B) can be conducted by deaeration or compaction.

Thermal treatment of the hydrophilic granular material produced in step b) in process (A) can be conducted at temperatures of 200 to 1500° C., preferably of 400 to 1400° C., preferably of 500 to 1200° C., more preferably of 600 to 1100° C., most preferably of 800 to 1100° C.

In step c) of process (B) according to the invention, the treatment of the hydrophilic granular material produced in step b) with ammonia takes place, preferably gaseous ammonia. The duration over which step c) of process (B) according to the invention is conducted depends upon factors including the chemical composition, particle size of the material and temperature. The duration is generally from 10 minutes to 100 hours, preferably 0.5 to 20 hours. Preferred temperatures here are in the range from 0 to 200° C., more preferably from 20 to 100° C.

For the treatment with ammonia in step c) of process (B) according to the invention, ammonia can be introduced into the chamber envisaged for the purpose together with the hydrophilic granular material to be treated. The chamber merely has to meet the requirement that it is capable of maintaining the pressures and temperatures necessary in the process according to the invention. The pressure differential $\Delta p=p2-p1$, with p1=pressure in the chamber prior to introduction of the gaseous ammonia, p2=pressure in the chamber at which the introduction of the gaseous ammonia is stopped, is preferably more than 20 mbar, more preferably from 50 mbar to 5 bar, especially preferably from 100 mbar to 500 mbar, most preferably from 200 mbar to 400 mbar.

In addition to ammonia, in step c) of process (B), steam can be added to the granular material produced beforehand, preferably at a relative vapour pressure of 50% to 95%.

The hydrophobizing agent used in step d) of process (A) or (B) may comprise a silicon compound which is preferably selected from the group consisting of halosilanes, alkoxysilanes, silazanes and siloxanes.

A silicon compound of this kind is more preferably a liquid compound having at least one alkyl group and a boiling point of less than 200° C. It is preferably selected from the group consisting of $CH_3SiCl_3$, $(CH_3)_2SiCl_2$, $(CH_3)_3SiCl$, $C_2H_5SiCl_3$, $(C_2H_5)_2SiCl_2$, $(C_2H_5)_3SiCl$, $C_3H_8SiCl_3$, $CH_3Si(OCH_3)_3$, $(CH_3)_2Si(OCH_3)_2$, $(CH_3)_3SiOCH_3$, $C_2H_5Si(OCH_3)_3$, $(C_2H_5)_2Si(OCH_3)_2$, $(C_2H_5)_3SiOCH_3$, $C_8H_{15}Si(OC_2H_5)_3$, $C_8H_{15}Si(OCH_3)_3$, $(H_3C)_3SiNHSi(CH_3)_3$, $(H_3C)_3SiOSi(CH_3)_3$ and mixtures thereof. Particular preference is given to $(H_3C)_3SiNHSi(CH_3)_3$, $(H_3C)_3SiOSi(CH_3)_3$ and $(CH_3)_2SiCl_2$.

In the process (A) or (B) according to the invention, step b) and/or c) and/or d) may be followed by a separation of fractions of the granular material of different size from one another in such a way that only one or more fractions having particular particle sizes are separated off and used further.

Another subject-matter of the present invention is a thermal insulating composition comprising the hydrophobized granular material of the invention. The thermal insulating composition according to the invention can comprise at least one binder, which joins the individual parts of the cured composition to one another and optionally to one or more fillers and/or other additives and can thus improve the mechanical properties of the cured composition. Such a binder can contain organic or inorganic substances. The binder optionally contains reactive organic substances. Organic binders can, for example, be selected from the group consisting of (meth)acrylates, alkyd resins, epoxy resins, gum Arabic, casein, vegetable oils, polyurethanes, silicone resins, wax, cellulose glue and mixtures thereof. Such reactive organic substances can lead to the curing of the thermal insulating composition used, for example by polymerization, crosslinking reaction or another type of chemical reaction. Such curing can take place, for example, thermally or under the action of UV radiation or other radiation. Both single (one) component (1-C) and multicomponent systems, particularly two component systems (2-C) can be applied as binder. Particularly preferred for the present invention are (meth)acrylate based and silicone binders (preferably as one-component systems) and epoxy resins (preferably as two-component systems).

The most organic based binder materials like (meth)acrylates and epoxy resins have particular thermal limitations and cannot be used at temperatures above 150° C. In contrast to that, the siloxane based materials (silicone resins) are generally more thermostable and can be applied up to the temperature of about 600° C. without thermal degradation. Such organosiloxane binders (silicone resins) or hybrid systems containing silicone based organic ingredients and other organic ingredients are particularly preferred for the use in the composition of the present invention.

In addition to the organic binder or as an alternative thereto, the thermal insulating composition of the invention can contain inorganic curable substances. Such inorganic binders, also referred to as mineral binders, have essentially the same task as the organic binders, that of joining additive substances to one another. Furthermore, inorganic binders are divided into non-hydraulic binders and hydraulic binders. Non-hydraulic binders are water-soluble binders such as calcium lime, Dolomitic lime, gypsum and anhydrite, which only cure in air. Hydraulic binders are binders which cure in air and in the presence of water and are water-insoluble after the curing. They include hydraulic limes, cements, masonry cements. The mixtures of different inorganic binders can also be used in the thermal insulating composition of the present invention.

The thermal insulating composition of the invention preferably contains 5 to 60% by weight of a hydrophobized granular material of the invention, and 40 to 95% by weight of an inorganic and/or an organic binder.

The curing of the thermal insulating composition can be achieved by at least partial polymerization and/or vaporization of the solvent. Depending on the system used, this step can preferably take place at a temperature of from 0 to 500° C., particularly preferably from 5 to 400° C., very particularly preferably from 10 to 300° C. The curing can take place in the presence of air or with exclusion of oxygen, for example under a protective-gas atmosphere of nitrogen or carbon dioxide. Said step can take place under standard pressure or under a reduced pressure, for example under vacuum.

Apart from the hydrophobized granular material and the binder, the thermal insulating composition according to the invention can additionally contain at least one solvent and/or filler and/or other additives.

The solvent used in the composition of the invention can be selected from the group consisting of water, alcohols, aliphatic and aromatic hydrocarbons, ethers, esters, aldehydes, ketones and the mixtures thereof. For example, the solvent used can be water, methanol, ethanol, propanol, butanol, pentane, hexane, benzene, toluene, xylene, diethyl ether, methyl tert-butyl ether, ethyl acetate, acetone. Particularly preferably, the solvents used in the thermal insulating composition have a boiling point of less than 300° C., particularly preferably less than 200° C. Such relatively volatile solvents can be easily evaporated or vaporized during the curing of the thermal insulating composition according to the invention. Most preferably, the thermal insulating composition of the invention contain water as a sole solvent.

The hydrophobized granular material according to the invention and the thermal insulating composition based thereof can in general be used for thermal and/or acoustic insulation, particularly for the acoustic and/or thermal insulating of walls, roofs, houses and thermal insulating of industrial plants, parts of industrial apparatuses, pipelines and suchlike.

EXAMPLES

Preparation of Silica Granular Material A (Comparative Example)

Preparation of hydrophobized silica granular material containing IR-opacifier has been conducted according to PCT/EP2018/051142:

Mixing 1000F silicon carbide (Carsimet), manufacturer: Keyvest, 20% by weight, and AEROSIL® 200 hydrophilic silica (BET=200 m²/g, manufacturer: EVONIK Resource Efficiency GmbH), 80% by weight, were mixed by means of a Minox PSM 300 HN/1 MK ploughshare mixer.

Densification

The mixture of AEROSIL® 200 with silicon carbide produced as described above was densified with a Grenzebach densifying roll (Vacupress VP 160/220). The tamped density of the granular material obtained was adjusted via the contact pressure, the roll speed and the reduced pressure applied. The vacuum applied was less than 300 mbar, absolute.

The roll speed was 5 rpm, and the pressure was 2000 N.

Sintering/Hardening

The subsequent thermal hardening was effected in an XR 310 chamber kiln from Schröder Industrieöfen GmbH. For this purpose, multiple layers with a bed of height up to 5 cm were subjected to a temperature programme. The temperature ramp was 300 K/h up to the target temperature of 950°

C.; the hold time was 3 hours; then the samples were cooled (without active cooling) until removal.

Hydrophobization

The final hydrophobization of the thermally hardened granular material was effected at elevated temperatures over the gas phase. For this purpose, hexamethyldisilazane (HMDS) as hydrophobizing agent was evaporated and conducted through by the reduced pressure process in accordance with the process from Example 1 of WO 2013/013714 A1. The specimens were heated to more than 100° C. in a desiccator and then evacuated. Subsequently, gaseous HMDS was admitted into the desiccator until the pressure had risen to 300 mbar. After the sample had been purged with air, it was removed from the desiccator.

Sieving/Fractionation

In order to obtain desired fractions, the thermally hardened granular material was first fed to an oscillating sieve mill with mesh size 3150 μm (manufacturer: FREWITT), in order to establish an upper particle limit and hence remove the particles larger than this upper limit. This was followed by the desired fractionation of the particle fractions, for example from 200 to 1190 μm or from 1190 to 3150 μm. This was done using a vibrating sieve from Sweco, model LS18S. The average particle size of the sieve fraction of granular material A of from 200 to 1190 μm was $d_{50}$=580 μm.

Preparation of Silica-Alumina Granular Material B According to the Invention

Silica-alumina granular material B was prepared analog to silica granular material A with the difference, that the raw material AEROSIL® 200 was replaced by AEROSIL® MOX 170 (pyrogenic silica-alumina mixed oxide containing ca. 1 wt. % aluminium oxide with BET=170 m$^2$/g, manufacturer: EVONIK Resource Efficiency GmbH) and the sintering temperature in sintering/hardening step was reduced to 850° C. The average particle size of the sieve fraction of granular material B of from 200 to 1190 μm was $d_{50}$=440 μm.

Used Binders

Binder A: Acronal Eco 6270 (manufacturer: BASF); an acrylic-functionalized binder system.

Binder B: Coatosil DRI (manufacturer: Momentive); a siloxane-functionalized binder system.

Viscosity Measurement

A rotational viscometer Brookfield DV2T Extra was used to conduct measurements of the dynamic viscosity of the formulations (mixture of binder and granular material). Spindles and rotational velocity were chosen according to the given viscosity range in the manual.

General Experiment Description for Measuring Viscosity of Compositions with Granular Material after Various Storage Times Preparation of the Formulations:

Binder (276 g) was filled into a cylindrical glass vessel with 9.5 cm diameter and stirred with a propeller stirrer at 600 rpm. Granular material (24 g, sieve fraction 200-1190 μm) were gradually added to the stirred binder, and the stirring was continued until a homogeneous mixture has been achieved, i.e. all the granular material was incorporated into the mixture with a binder.

Measurements:

The dynamic viscosity of all samples was measured immediately after their preparation.

The samples were closed with an impermeable lid and additionally sealed with a Parafilm M foil. The thus closed samples were stored at two different temperatures (25° C. and 40° C.) without stirring, opened after defined time of storage for a measurement of the dynamic viscosity, as previously described, and closed again for further storage. For three weeks, all samples were measured twice a week to observe their thickening behaviour.

EXAMPLES

Comparative Example 1

Granular material A (sieve fraction 200-1190 μm) was tested with binder A at 25° C. according to the general experiment description.

Example 1

Granular material B (sieve fraction 200-1190 μm) was tested with binder A at 25° C. according to the general experiment description.

Comparative Example 2

Granular material A (sieve fraction 200-1190 μm) was tested with binder A at 40° C. according to the general experiment description.

Example 2

Granular material B (sieve fraction 200-1190 μm) was tested with binder A at 40° C. according to the general experiment description.

Comparative Example 3

Granular material A (sieve fraction 200-1190 μm) was tested with binder B at 25° C. according to the general experiment description.

Example 3

Granular material B (sieve fraction 200-1190 μm) was tested with binder B at 25° C. according to the general experiment description.

Comparative Example 4

Granular material A (sieve fraction 200-1190 μm) was tested with binder B at 40° C. according to the general experiment description.

Example 4

Granular material B (sieve fraction 200-1190 μm) was tested with binder B at 40° C. according to the general experiment description.

Comparative Example 5

Granular material A (sieve fraction 200-1190 μm) was crushed with a knife mill GRINDOMIX GM 300 (Retsch) for 1 minute at 2000 rpm to obtain a fine powder with an average particle size of $d_{50}$=208 μm. This powder was tested with Binder A at 25° C. according to the general experiment description Example 5

Granular material B (sieve fraction 200-1190 μm) was crushed with a knife mill GRINDOMIX GM 300 (Retsch)

for 1 minute at 2000 rpm to obtain a fine powder with an average particle size of $d_{50}=158$ μm. This powder was tested with Binder A at 25° C. according to the general experiment description The results of the viscosity measurement after various storage time are summarized in Table 1. These results show clearly, that the compositions with granular material based on a mixed oxide according to the invention (examples 1-5) provide significantly lower viscosities when compared with the similar materials based on pure silica (comparative examples 1-5).

TABLE 1

| example | Storage temperature [° C.] | Storage time [days] | | | | | | |
|---|---|---|---|---|---|---|---|---|
| | | 0 | 4 | 7 | 12 | 15 | 19 | 22 |
| | | Viscosity [Poise] | | | | | | |
| Comparative example 1 | 25 | 26.0 | 539 | 696 | 667 | 2864 | 3136 | 3872 |
| Example 1 | 25 | 10.3 | 606 | 314 | 223 | 432 | 571 | 536 |
| Comparative example 2 | 40 | 26.4 | 2000 | 2928 | 3576 | 3480 | 4584 | 3584 |
| Example 2 | 40 | 10.7 | 790 | 1552 | 2010 | 2312 | 2496 | 2568 |
| Comparative example 3 | 25 | 17.9 | 39.4 | 32.4 | 25.4 | 28.4 | 27.6 | 28.0 |
| Example 3 | 25 | 4.5 | 4.9 | 3.5 | 4.5 | 3.6 | 3.6 | 3.7 |
| Comparative example 4 | 40 | 10.7 | 19.9 | 15.2 | 22.6 | 15.2 | 14.8 | 15.1 |
| Example 4 | 40 | 3.2 | 3.6 | 2.9 | 3.1 | 3.3 | 3.2 | 3.4 |
| Comparative example 5 | 25 | 43.2 | 805 | 3456 | 3784 | 3672 | | |
| Example 5 | 25 | 33.4 | 162 | 214 | 558 | 589 | 680 | 750 |

The invention claimed is:

1. A hydrophobized granular material comprising from 30 to 95% by weight of a mixed oxide based on silica and at least one oxide of metal M selected from the group consisting of: Al; Ti; and Fe; wherein the mixed oxide comprises from 0.1 to 10% by weight of the metal M oxide, and from 5 to 70% by weight of at least one IR-opacifier selected from the group consisting of: silicon carbide; zirconium dioxide; ilmenites; iron titanates; zirconium silicates; manganese oxides; graphites; carbon blacks; and mixtures thereof.

2. The hydrophobized granular material of claim 1, wherein the mixed oxide is a pyrogenic silica-alumina mixed oxide.

3. The hydrophobized granular material of claim 1, wherein the granular material has a methanol wettability of 10% to 80% methanol by volume in a methanol/water mixture.

4. The hydrophobized granular material of claim 1, wherein the granular material has a numerical median particle size $d_{50}$ of greater than 10 μm.

5. The hydrophobized granular material of claim 1, wherein the granular material is essentially free of particles smaller than 200 μm.

6. The hydrophobized granular material of claim 1, wherein the hydrophobized granular material has a BET surface area of 50 to 400 m²/g.

7. The hydrophobized granular material of claim 1, wherein the granular material has a tamped density of 50 to 300 g/L.

8. The hydrophobized granular material of claim 1, wherein the granular material has a hydroxyl group density of no greater than 0.3 mmol OH/g.

9. The hydrophobized granular material of claim 2, wherein the granular material has a methanol wettability of 10% to 80% methanol by volume in a methanol/water mixture.

10. The hydrophobized granular material of claim 9, wherein the granular material has a numerical median particle size $d_{50}$ of greater than 10 μm.

11. The hydrophobized granular material of claim 4, wherein the granular material is essentially free of particles smaller than 200 μm.

12. The hydrophobized granular material of claim 11, wherein the hydrophobized granular material has a BET surface area of 50 to 400 m²/g.

13. The hydrophobized granular material of claim 11, wherein the granular material has a tamped density of 50 to 300 g/L.

14. The hydrophobized granular material of claim 13, wherein the granular material has a hydroxyl group density of no greater than 0.3 mmol OH/g.

15. A process for producing a hydrophobized granular material of claim 1, comprising the following steps:
   a) mixing a hydrophilic silica based mixed oxide with at least one IR opacifier;
   b) densifying the mixture obtained in step a) to give a hydrophilic granular material;
   c) either subjecting the hydrophilic granular material produced in step b) to thermal treatment at a temperature of 200 to 1200° C. or treating the hydrophilic granular material produced in step b) with ammonia;
   d) hydrophobizing the hydrophilic granular material subjected to thermal treatment in step c) with a hydrophobizing agent.

16. The process of claim 15, wherein, in step c), the hydrophilic granular material produced in step b) is subjected to thermal treatment at a temperature of 200 to 1200° C.

17. The process of claim 15, wherein, in step c), the hydrophilic granular material produced in step b) is treated with ammonia.

18. A thermal insulating composition comprising the hydrophobized granular material of claim 1.

19. The thermal insulating composition of claim 18, comprising at least one organic binder selected from the group consisting of: (meth)acrylates; alkyd resins; epoxy resins; gum Arabic; casein; vegetable oils; polyurethanes; silicone resins; wax; cellulose glue; and mixtures thereof.

20. The thermal insulating composition of claim 18, comprising at least one inorganic binder selected from the group consisting of: calcium lime; Dolomitic lime; gypsum; anhydrite; hydraulic limes; cements; masonry cements; and mixtures thereof.

* * * * *